US007577165B1

(12) United States Patent
Barrett

(10) Patent No.: US 7,577,165 B1
(45) Date of Patent: Aug. 18, 2009

(54) METHOD AND SYSTEM OF ORTHOGONAL SIGNAL SPECTRUM OVERLAY (OSSO) FOR COMMUNICATIONS

(76) Inventor: Terence W. Barrett, 1453 Beulah Rd., Vienna, VA (US) 22182

( * ) Notice: Subject to any disclaimer, the term of this patent is extended or adjusted under 35 U.S.C. 154(b) by 1038 days.

(21) Appl. No.: 10/765,990

(22) Filed: Jan. 29, 2004

Related U.S. Application Data

(60) Provisional application No. 60/444,970, filed on Feb. 5, 2003.

(51) Int. Cl.
*H04J 3/18* (2006.01)
(52) U.S. Cl. .................. 370/477; 370/208; 370/330; 370/478; 370/205
(58) Field of Classification Search .......... 370/206, 370/203, 447, 478, 330, 208, 477, 205
See application file for complete search history.

(56) References Cited

U.S. PATENT DOCUMENTS

| | | | | |
|---|---|---|---|---|
| 4,222,115 | A * | 9/1980 | Cooper et al. ............... | 375/130 |
| 5,486,833 | A * | 1/1996 | Barrett ........................ | 342/204 |
| 5,546,477 | A * | 8/1996 | Knowles et al. ............. | 382/242 |
| 5,640,423 | A * | 6/1997 | Archer ........................ | 375/261 |
| 5,790,516 | A * | 8/1998 | Gudmundson et al. ....... | 370/210 |
| 5,828,660 | A * | 10/1998 | Baum et al. .................. | 370/330 |
| 5,910,905 | A * | 6/1999 | Qian et al. ................... | 708/311 |
| 5,940,141 | A * | 8/1999 | Faroudja et al. ............. | 348/628 |
| 6,278,686 | B1 * | 8/2001 | Alard .......................... | 370/204 |
| 6,470,055 | B1 * | 10/2002 | Feher .......................... | 375/259 |
| 6,608,874 | B1 * | 8/2003 | Beidas et al. ................ | 375/353 |
| 6,654,431 | B1 * | 11/2003 | Barton et al. ................ | 375/346 |
| 6,760,388 | B2 * | 7/2004 | Ketchum et al. ............. | 375/295 |
| 6,778,514 | B1 * | 8/2004 | Boccuzzi et al. ............. | 370/334 |
| 7,092,436 | B2 * | 8/2006 | Ma et al. ..................... | 375/229 |
| 7,092,440 | B1 * | 8/2006 | Dress et al. .................. | 375/140 |
| 7,206,359 | B2 * | 4/2007 | Kjeldsen et al. ............. | 375/316 |
| 2002/0080889 | A1 * | 6/2002 | Dress et al. .................. | 375/295 |
| 2003/0108028 | A1 * | 6/2003 | Brunner et al. .............. | 370/347 |
| 2003/0157905 | A1 * | 8/2003 | Holmqvist .................... | 455/102 |

OTHER PUBLICATIONS

Haas et al; "A Time-Frequency Well-Localized Pulse for Multiple Carrier Transmission"; 1994; IEEE; pp. 1-17.*
Walton et al; Hermite Wavelets for Multicarrier Data Transmission; 1993; IEEE; pp. 40-45.*

(Continued)

*Primary Examiner*—Frank Duong
*Assistant Examiner*—DeWanda Samuel
(74) *Attorney, Agent, or Firm*—Bacon & Thomas, PLLC

(57) ABSTRACT

A method and system for increasing the effective communications channel bandwidth beyond that of the constrained physical bandwidth of a given channel by orthogonal signal spectrum overlay (OSSO) comprising: decomposing the time-bandwidth product (TBP) of a given symbol in a data stream transmitted through a given bandwidth, expanding the TBP in terms of overlaid orthogonal signals such as Weber-Hermite (WH) functions that constitute the eigensignals of the symbol. The complete data stream is multiplexed to produce a plurality of data channels, each of which is encoded on an orthogonal signal by quadrature amplitude modulation. The overlay of these signals constitutes the OSSO symbol. The OSSO symbols are transmitted in quadrature format (I and Q) and are the result of the addition of orthogonal signals, each of which constitutes a separate overlaid communication channel, occupying the same physical bandwidth.

10 Claims, 15 Drawing Sheets

OTHER PUBLICATIONS

Zou et al; "COFDM: An Overview"; 1995; IEEE; pp. 1-6.*

Barrett, T.W., The information content of an electromagnetic field with relevance to sensory processing of information. *T.I.T. J. Life Sciences*, 1, 129-135, 1971.

Barrett, T.W., On vibrating strings and information theory. *J. Sound & Vibration*, 20, 407-412, 1972.

Barrett, T.W., Conservation of Information. *Acustica*, 27, 44-47, 1972.

Barrett, T.W., Definition precedence of signal parameters: sequential versus simultaneous information. *Acustica*, 27, 90-93, 1972.

Barrett, T.W., The conceptual basis for two information theories—a reply to some criticisms. *J. Sound & Vibration*, 25, 638-642, 1972.

Barrett, T.W., Analytical information theory. *Acustica*, 29, 65-67, 1973.

Barrett, T.W., Structural information theory. *J. Acoust. Soc. Am.*, 54, 1092-1098, 1973.

Barrett, T.W., Structural information theory based on electronic configurations. *T.I.T. J. Life Sciences*, 5, 29-42; 1975.

Barrett, T.W., Nonlinear analysis and structural information theory: a comparison of mathematical and physical derivations. *Acustica*, 33, 149-165, 1975.

Barrett, T.W., On linearizing nonlinear systems. *J. Sound & Vibration*, 39, 265-268, 1975.

Barrett, T.W., Linearity in secular systems: four parameter superposition. *J. Sound & Vibration*, 41, 259-261, 1975.

Barrett, T.W., Information measurement I. On maximum entropy conditions applied to elementary signals. *Acustica*, 35, 80-85, 1976.

Barrett, T.W., Information measurement II. On minimum conditions of energy order applied to elementary signals. *Acustica*, 36, 282-286, 1976.

Barrett, T.W., Structural information theory of sound. *Acustica*, 36, 272-281, 1976.

Barrett, T.W., Quantum statistical foundations for structural information theory and communication theory. pp. 391-409 in V. Lakshmikantham (ed) *Nonlinear Systems & Applications: An International Conference*, Academic Press, New York (1977).

Wu, J., *Wavelet packet division multiplexing*. A thesis submitted to the School of Graduate Studies in Partial Fulfillment of the Requirements of the Degree of Ph.D., Electrical & Computer Engineering, McMaster University, 1998.

* cited by examiner

CROSS-CORRELATIONS: FREQUENCY DOMAIN

PRESENT

Frequency Domain
WH Signals: 0- 9
Crosscorrelation Absolute WH- 0

A

Frequency Domain
WH Signals: 0- 9
Crosscorrelation Absolute WH- 9

C

ABSENT

Frequency Domain
WH Signals: 1- 9
Crosscorrelation Absolute WH- 0

B

Frequency Domain
WH Signals: 0- 8
Crosscorrelation Absolute WH- 9

D

METHOD AND SYSTEM OF ORTHOGONAL SIGNAL SPECTRUM OVERLAY (OSSO) FOR COMMUNICATIONS

REFERENCE TO RELATED APPLICATION

This application claims the benefit of U.S. Provisional Application No. 60/444,970 filed Feb. 5, 2003, titled Method and Application of Orthogonal Signal Spectrum Overlay (OSSO) For Communications, which is hereby incorporated by reference.

BACKGROUND OF THE INVENTION

The present invention relates generally to increasing the spectral efficiency of communications channels limited by bandwidth restrictions. The method of the invention addresses increasing the bandwidth efficiency of any method of communications, whether wired, fiber, cable, wireless, optical, IR or RF communications, and at any signal frequency or for any channel bandwidth. The methods of prior art have not addressed increasing efficiency by overlaying signals in ways that are empirically realizable, nor by overlaying signals in time and frequency, nor by the specific methods described here. The invention increases spectral efficiency by increasing the effective bandwidth without increasing the physical bandwidth.

The methods described here permit the spectral overlay of signals within a transmitted symbol, each signal constituting a separate communications channel that can be modulated for data encoding by well-known methods, e.g., quadrature amplitude modulation (QAM), but yet without the need for additional physical bandwidth. Each signal overlaid within a symbol is orthogonal, and not because of spectral or time displacement, but because of minimum cross-correlation (or minimum least squares) when overlaid. As this new multiplexing method requires overlaid orthogonal signals to constitute the symbol, the method is called "Orthogonal Signal Spectrum Overlay" (OSSO).

OBJECTS OF THE INVENTION

Prior art does not provide methods for increasing spectral efficiency by overlaying signals (as opposed to locating subsignals side-by-side and nonoverlapping in time or frequency). For example, wavelet packet multiplexing (Wu, 1998) is a method whereby signals are waveform encoded on wavelet packet basis functions for transmission. OSSO differs from wavelet packet division multiplexing in that OSSO multiplexing is not wavelet coding in the accepted sense of dyadic signal decomposition.

OSSO:
Is not a tree-shaped decomposition.
Is not a linear combination of translated versions of functions higher in the tree.
Does not necessarily employ up-sampling and down-sampling.
Has no requirement for banks of actual or virtual FIR filters.
Is not a version of frequency division multiplexing (FDM), whether orthogonal frequency division multiplexing (OFDM) or otherwise.
Does not merely address single bit transmission.
Is not sub-band coding.
Does not address side-by-side positioning of constituent signals in the time or frequency domain.

In comparison: in the case of OSSO, constituent symbols are directly overlaid in both the time and frequency domains, not side-by-side displaced or positioned.

It is an object of the invention to increase the bandwidth efficiency of a general bandlimited communications channel by orthogonal signal spectrum overlay (OSSO) whereby additional communications channels are created which increase the effective bandwidth without the requirement of increasing the physical bandwidth.

It is a further object of the invention to implement OSSO by composing transmitted symbols with Weber-Hermite functions (FIG. 1; Barrett, 1971-7) or derivatives of raised cosine pulses, or by any method using signals orthogonal in direct overlay (as opposed to by displacement in time or frequency).

SUMMARY OF THE INVENTION

Briefly, the above and all other objects of the invention are achieved by a (virtual or actual) orthogonal decomposition of the time-bandwidth product (TBP) of a given symbol transmitted through a given bandwidth. The TBP is expanded in terms of, e.g., Weber-Hermite (WH) functions that constitute the eigensignals of the symbol, and are also, in the case of WH signals, the eigenmodes of the Fourier transform of the given bandwidth. The number of WH signals obtained in a specific symbol is set by the size of the TBP of the symbol. Separate overlaid streams or channels of data, resulting from multiplexing the complete data stream, are encoded on each WH signal by conventional, e.g., QAM or AM, methods. The OSSO symbol transmitted, which may be in I and Q form, is the result of the addition of the WH signals, each of which constitutes a separate overlaid communications channel but all together occupying the same set physical bandwidth.

At reception, the WH signals composing the OSSO symbol are separated by correlation or inner product methods. The result of these correlations/inner products in I and Q form recapture the signal constellation for each channel that are the basis for decoding the data streams before demultiplexing each channel from overlaid into serial form.

The invention features a method for increasing the effective communications channel bandwidth beyond that of the constrained physical bandwidth, and thereby permitting an increase in the data rate of the channel, by orthogonal signal spectrum overlay (OSSO) comprising: decomposing the time-bandwidth product (TBP) of a given symbol in a data stream transmitted through a given physical bandwidth, expanding said TBP in terms of an orthogonally overlaid signal basis set constituting the eigensignals of said symbol.

The invention further features the method defined above wherein the number of orthogonal signals obtained in a specific symbol is set by the size of the TBP of the symbol.

The invention further features the method defined above wherein the number of WH signals obtained in a specific symbol is set by the size of the TBP of the symbol.

The invention further features the method defined above wherein the complete data stream is multiplexed to produce a plurality of data channels, each of which is encoded on orthogonal signals.

The invention further features the method defined above wherein OSSO symbols and associated orthogonal signals are transmitted in quadrature format (I and Q) and is the result of the addition of orthogonal signals, each of which constitutes a separate but overlaid communication channel, all occupying the same physical bandwidth.

The invention further features a system for increasing the effective communications channel bandwidth beyond that of the constrained physical bandwidth, and thereby permitting an increase in the data rate of the channel, by orthogonal signal spectrum overlay (OSSO) comprising: means for decomposing the time-bandwidth product (TBP) of a given symbol in a data stream transmitted through a given bandwidth, expanding said TBP in terms of Weber-Hermite (WH) functions that constitute the eigensignals of said symbol within a set channel and means for transmitting the OSSO symbol to a point of utilization.

The invention further features the system defined above wherein the number of WH signals obtained in a specific symbol is set by the size of the TBP of the symbol.

The invention further features the system defined above including means to multiplex in the complete data stream to produce a plurality of data channels, each of which is encoded on WH signals.

The invention further features the system defined above wherein OSSO symbols and associated WH signals are transmitted in quadrature format (I and Q) and is the result of the addition of WH signals, each of which constitutes a separate overlaid communication channel, all occupying the same physical bandwidth.

BRIEF DESCRIPTION OF THE DRAWINGS

The above and other objects, advantages and features of the invention will become more apparent when considered with the following specification and accompanying drawings wherein:

FIG. 10A Top: WH0 in I (left) and Q (right) showing amplitude level relationship to a 16-QAM constellation. Bottom: WH1 showing the same relationship but to a separate 16-QAM constellation.

FIG. 10B Top: WH2 in I (left) and Q (right) showing amplitude level relationship to a 16-QAM constellation. Bottom: WH3 showing the same relationship but to a separate 16-QAM constellation.

DETAILED DESCRIPTION OF THE INVENTION

Figure 1:
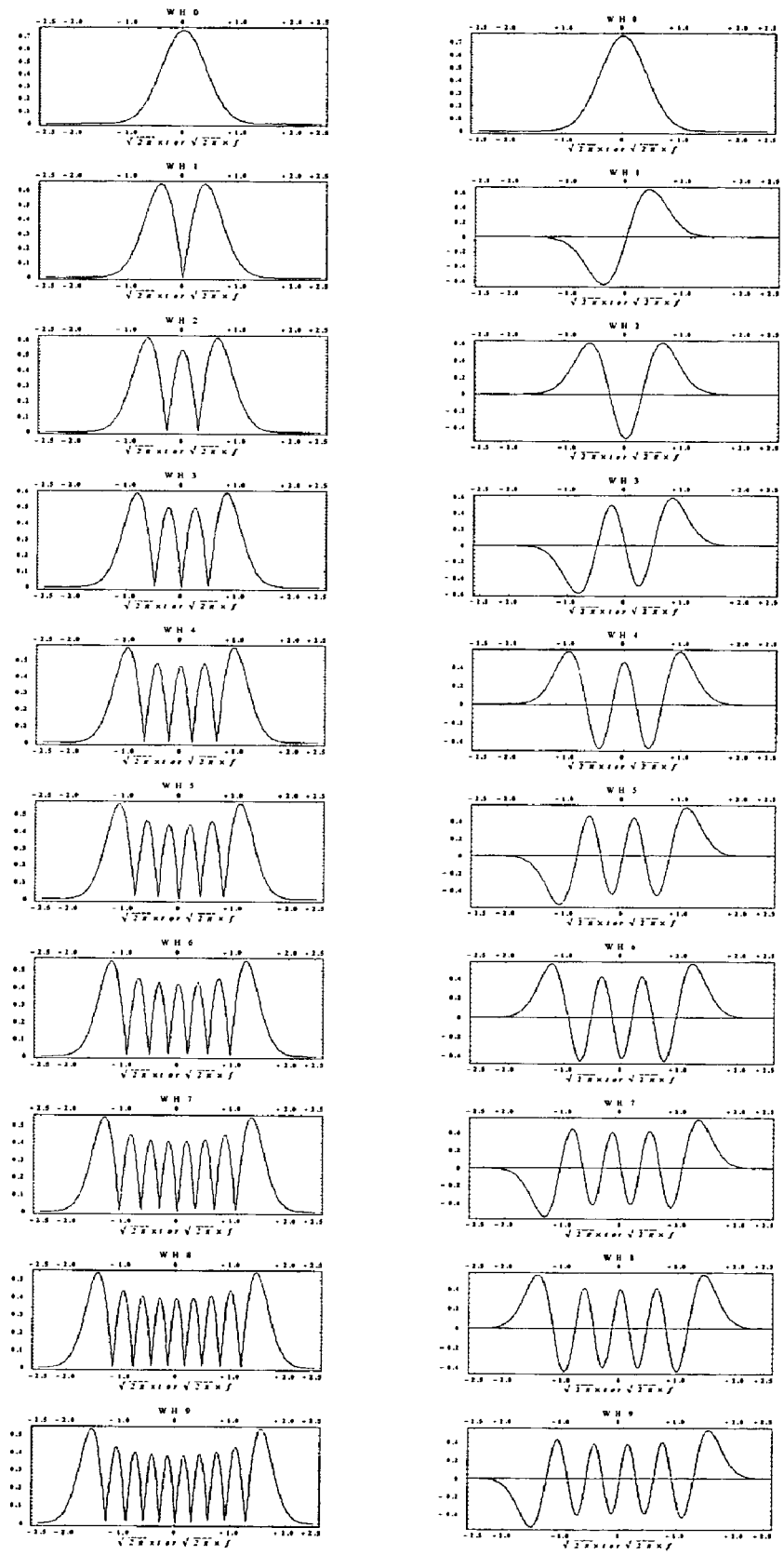
FIG. 1 Left column: absolute values for the first 10 WH signals (WH0-WH9, top to bottom) in both time and frequency domains. Right column: real values for the same 10 WH signals in the time domain.
Figure 2:
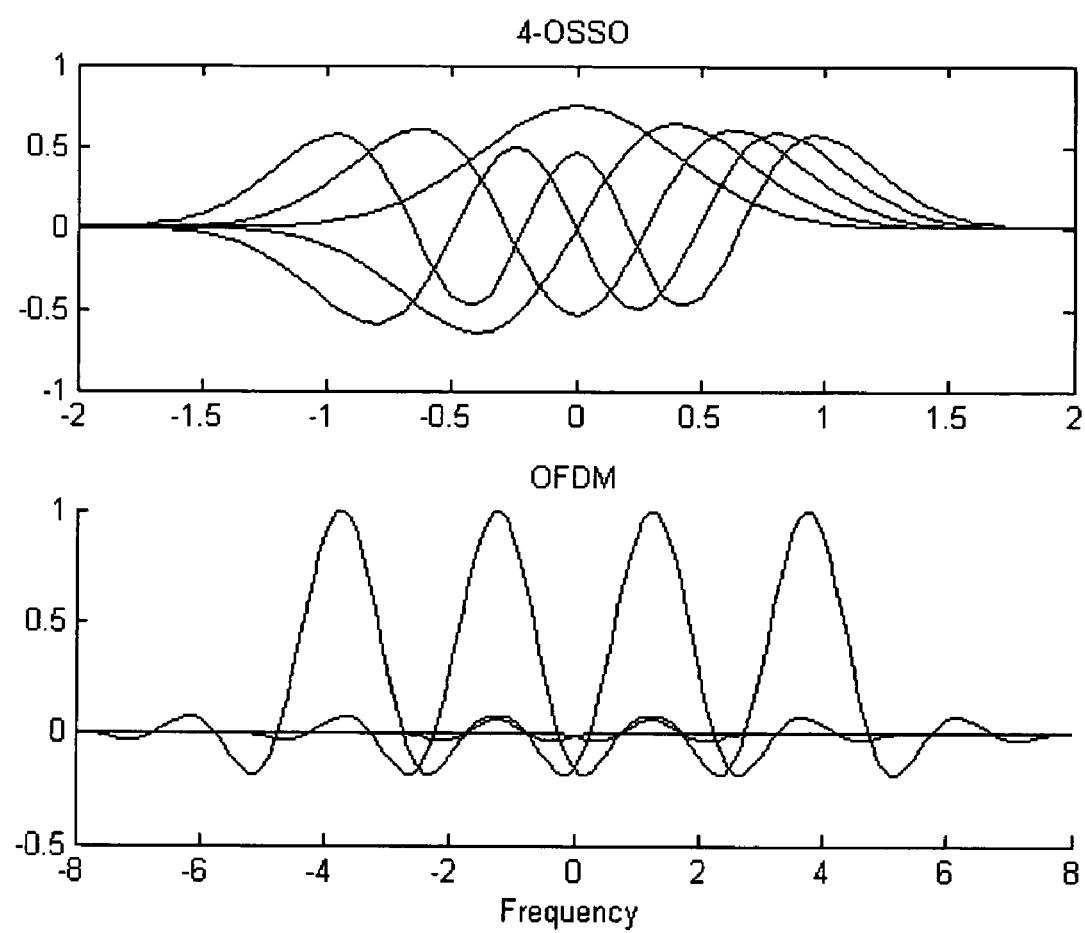
FIG. 2 Top: the envelope of an OSSO symbol composed of four WH signals—hence 4-OSSO represented in both the time and frequency domains. Bottom: an Orthogonal Frequency Division Multiplexing (OFDM) symbol in the frequency domain. In the case of OSSO, signal orthogonality is due to zero cross-correlation of the WH signals. In the case of OFDM, signal orthogonality is due to the displacement of the frequency content of each signal in the frequency domain.

WH signals (FIG. 1) are orthogonal in both the time and frequency domains when overlaid within a transmitted symbol—the OSSO symbol—and occupy no more physical bandwidth than that required for the WH signal of the largest time-bandwidth product. The number of WH signals that can occupy a given OSSO symbol is set by the time-bandwidth product of the OSSO symbol. The WH signals overlaid within the symbol are orthogonal in both the time and frequency domains, and the orthogonality of these WH signals does not arise from sub-band displacement in time as in the case of Walsh functions, in frequency, as in the case of wavelets or OFDM (see FIG. 2 for comparison). The orthogonality of WH signals is due to their correlation properties when precisely overlaid.

Figure 3:
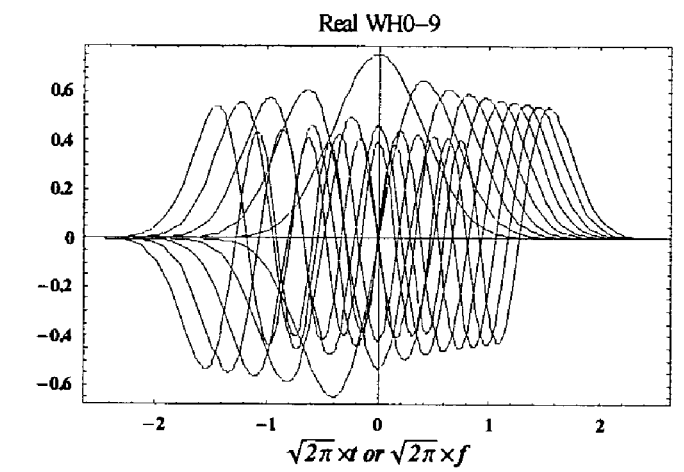
FIG. 3 Top: Representation of the envelope of a 10-OSSO symbol showing 10 WH signals (WH0-WH9) before summation, and in both the time and frequency domains and in either I or Q; Middle: Representation of the envelope of a 4-OSSO symbol showing 4 WH signals (WH0-WH3) before summation, and in both the time and frequency domains and in either I or Q. Bottom: Representation of the envelope of a 4-OSSO symbol after summation in both the time and frequency domains and in either I or Q.
Figure 3:
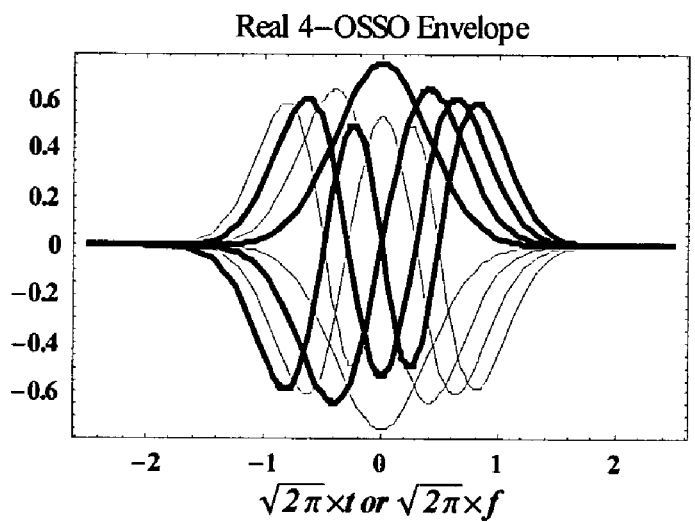
Figure 3:
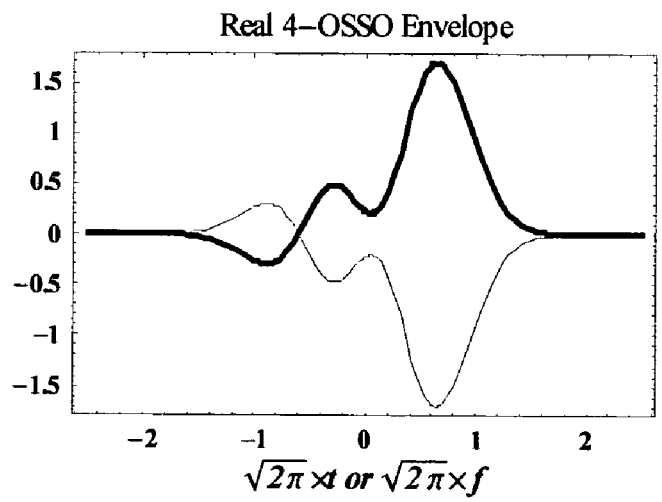
Figure 4:
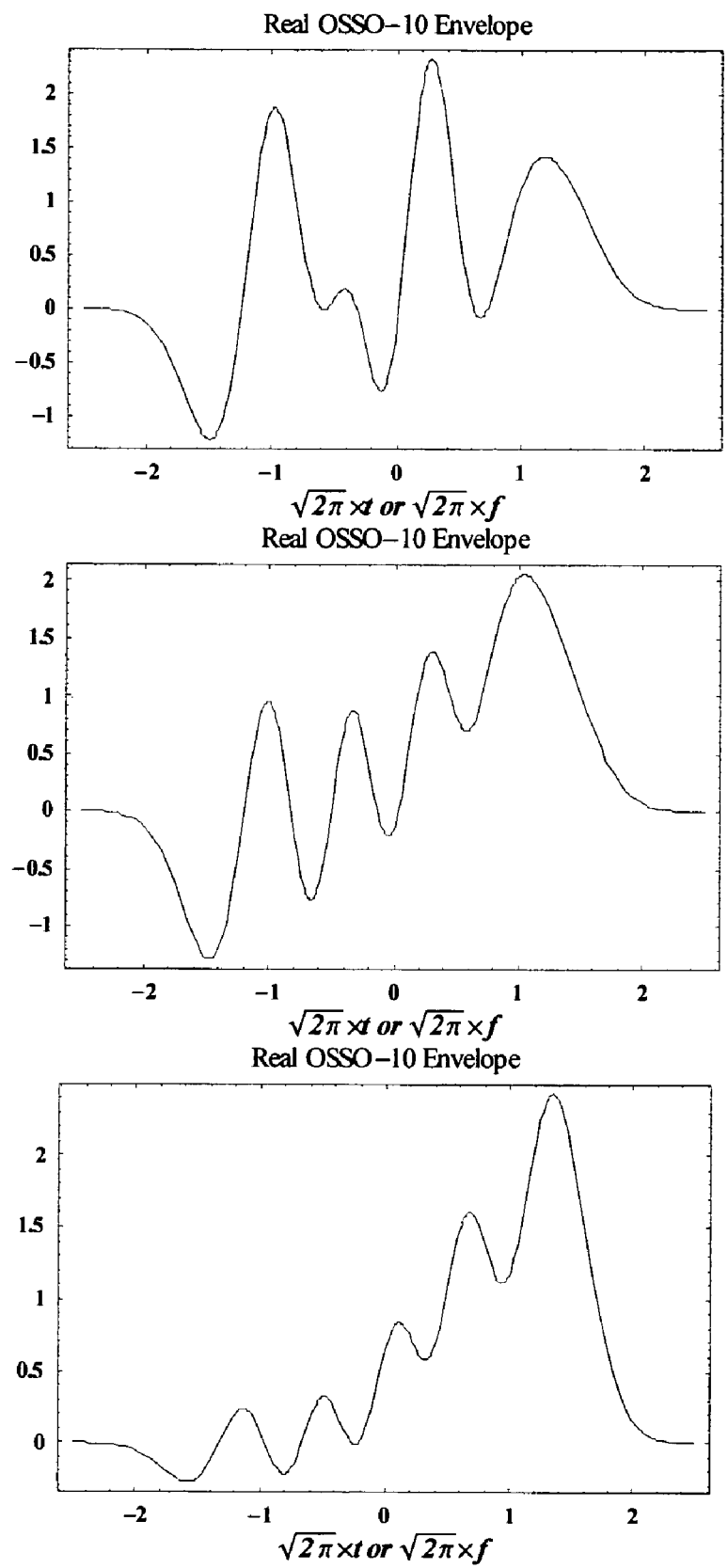
FIG. 4 Representative examples of 10-OSSO symbols in either the time or frequency domain after summation and in either I or Q.
Figure 5:
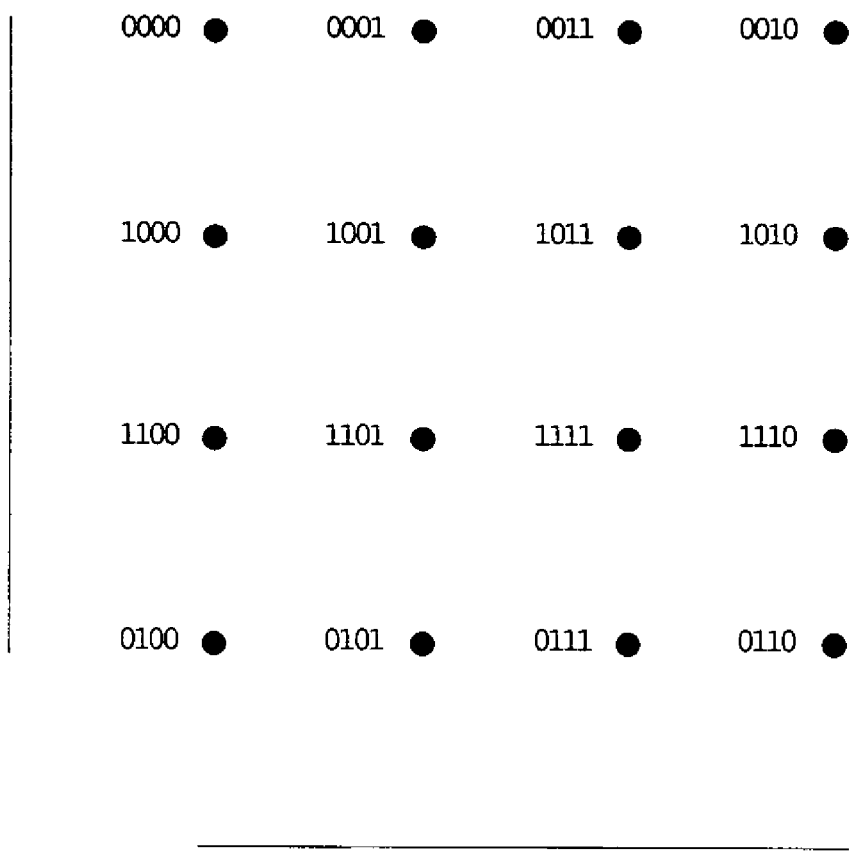
FIG. 5 Top: 16-QAM constellation. Bottom: representative 10-OSSO in either the time or frequency domains and in either I or Q. Each of the WH signals in an OSSO symbol is independently modulated according to a QAM scheme in I and Q.
Figure 5:
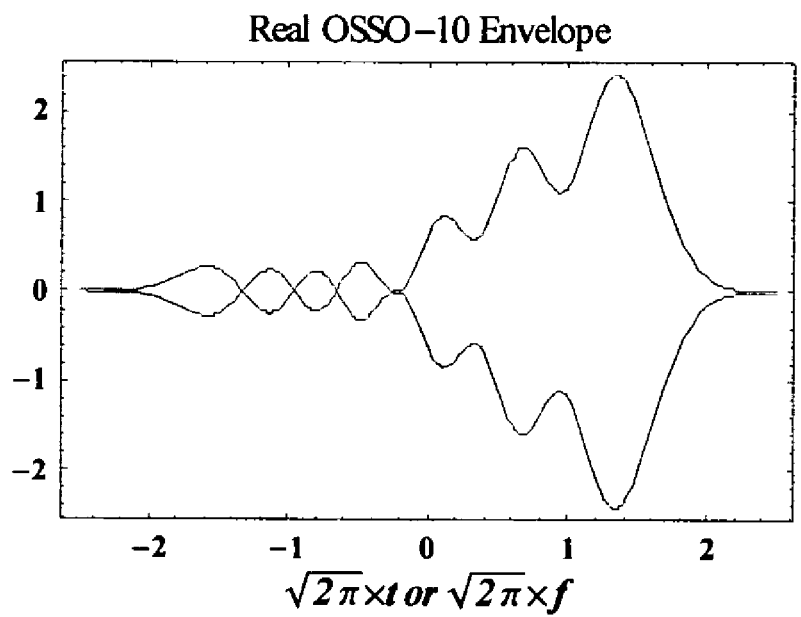
Figure 6:
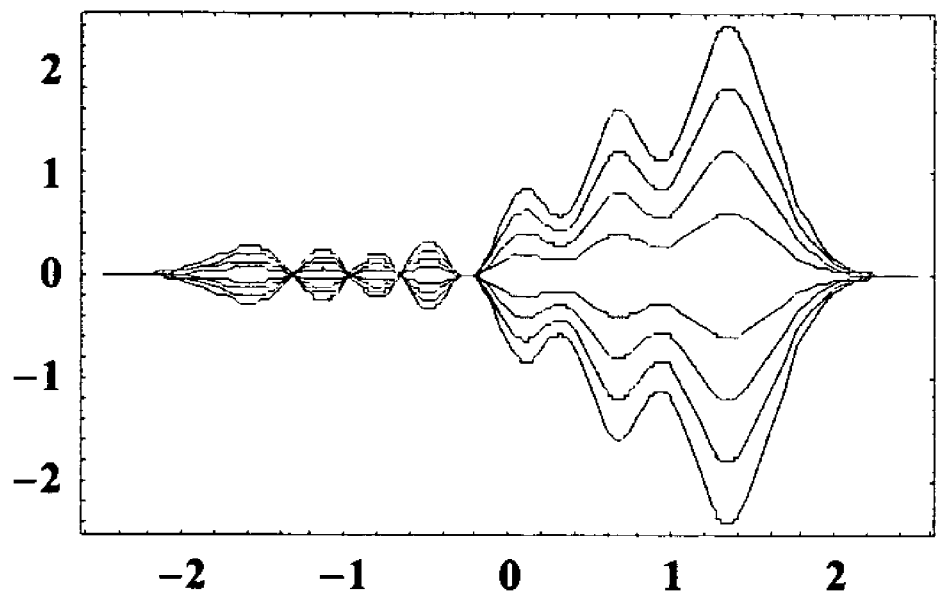
FIG. 6 Representative 10-OSSO symbols in the time or frequency domains and in I or Q showing possible amplitude levels and with all WH signals equally amplitude modulated.
Figure 6:
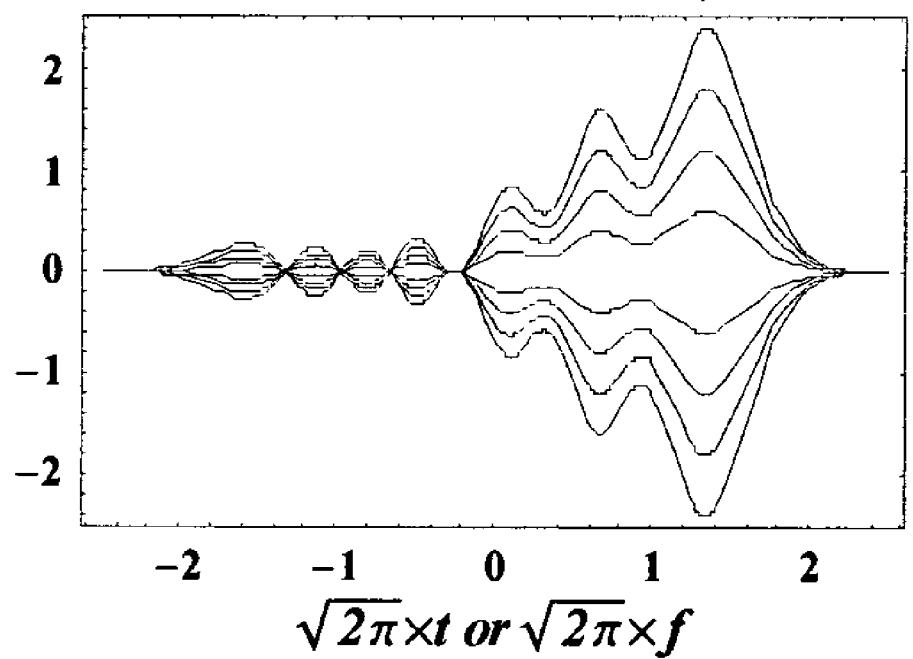
Figure 7:
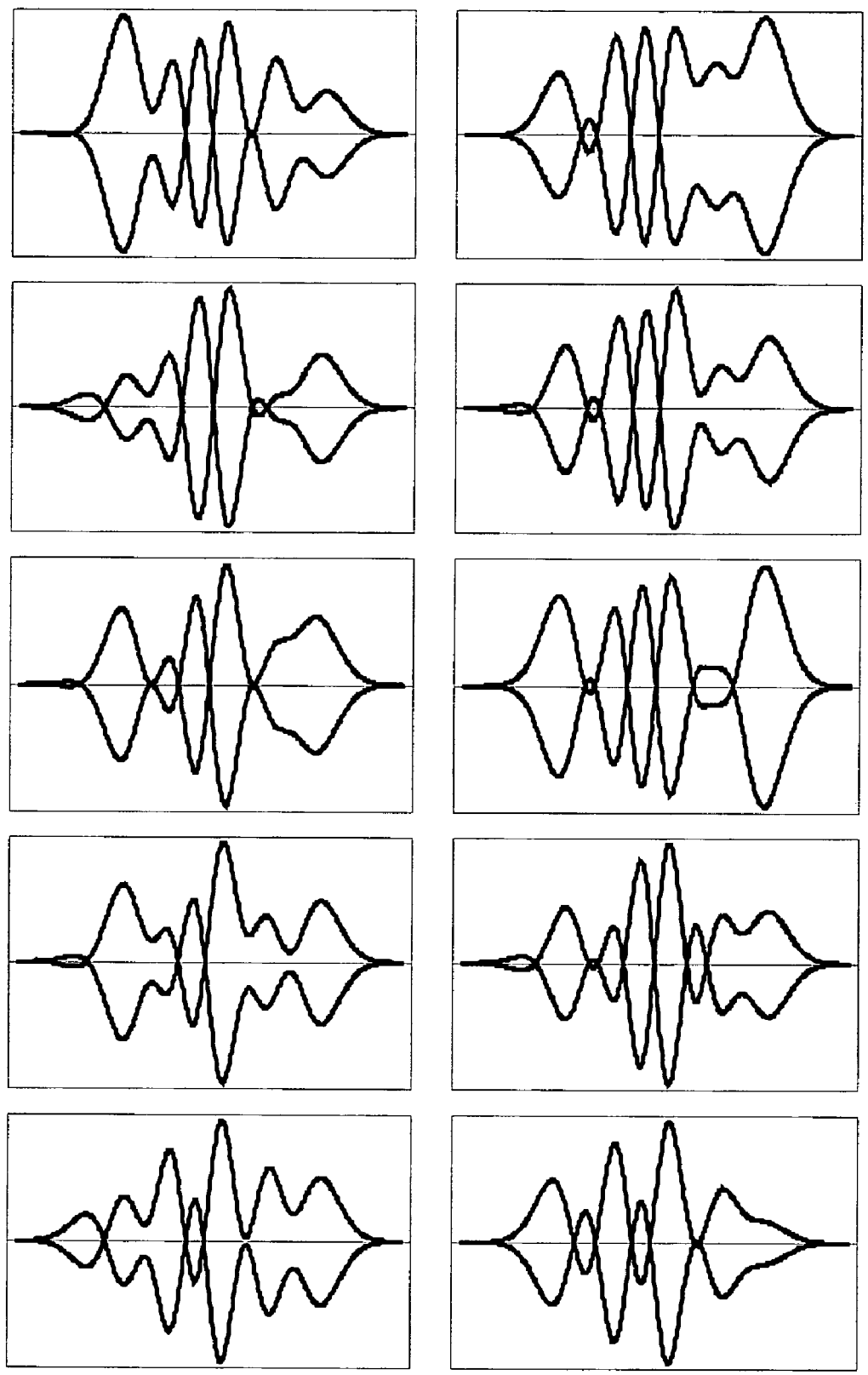
FIG. 7 Representative 10-OSSO symbols with all WH signals independently amplitude modulated and in either I or Q.

The summation of the WH signals constitutes the envelope of an OSSO symbol which is transmitted in both I and Q form (FIG. 3). The WH signals can be generated analytically, so the OSSO symbol can be generated digitally (FIG. 4). Each of the WH signals within an OSSO symbol is modulated, e.g., QAM-modulated, in I and Q (FIGS. 5, 6 and 7).

Figure 8A:
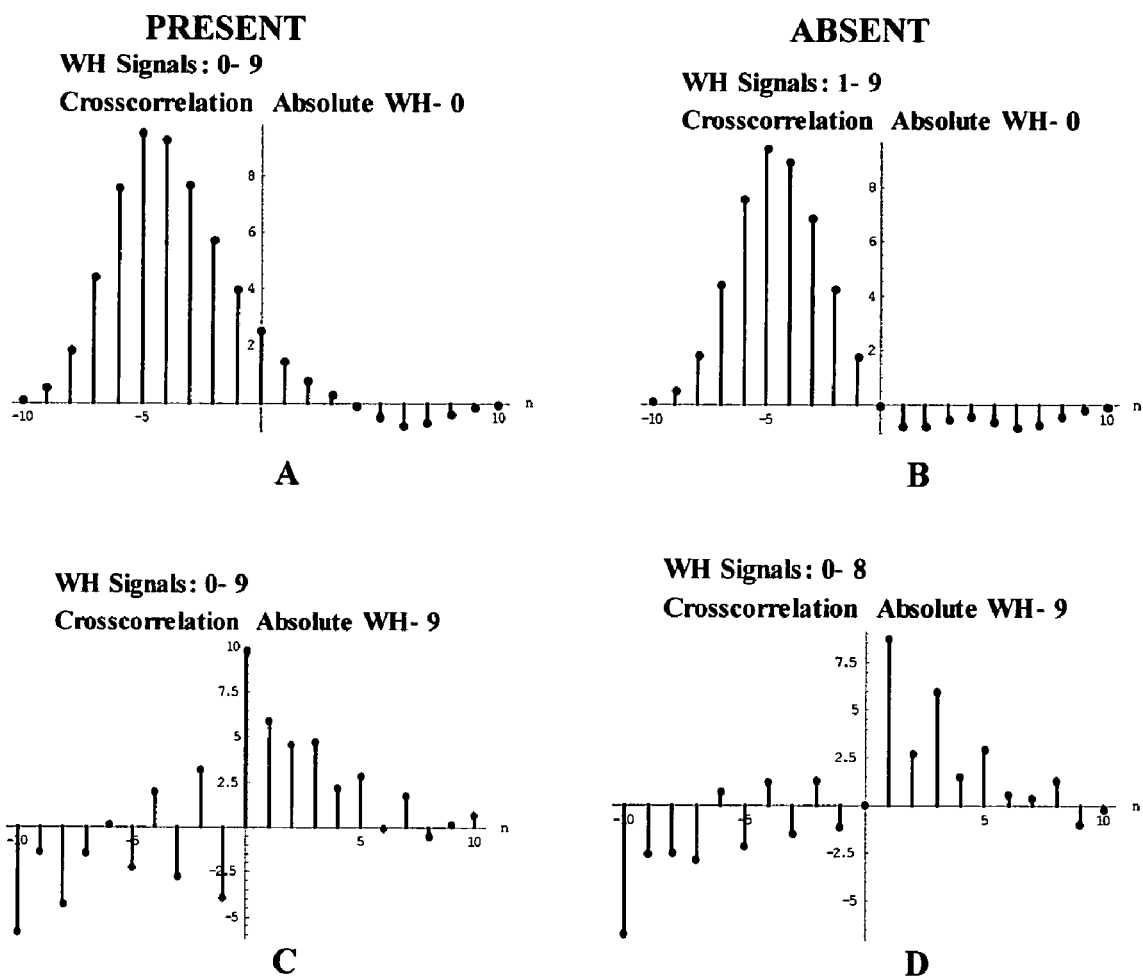
FIG. 8A Examples of cross-correlations of signal templates with OSSO symbols in the time domain. Cross-correlations of A: The WH0 signal template with a 10-OSSO symbol in which WH0 is present, and B: with a 9-OSSO symbol in which the WH0 signal is absent. In A, there is a finite amplitude at the zeroth time position; in B the amplitude is zero. Cross-correlations of C: The WH9 signal template with a 10-OSSO symbol in which WH9 is present, and D: with a 9-OSSO symbol in which the WH9 signal is absent. In C, there is a finite amplitude at the zeroth time position; in D the amplitude is zero.
Figure 8B:
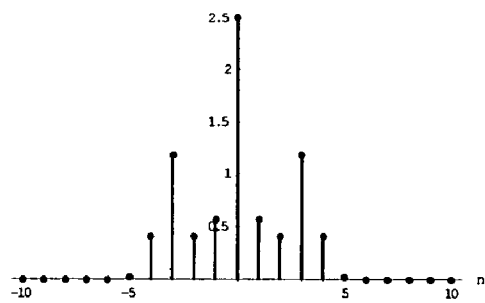
FIG. 8B Examples of cross-correlations of signal templates with OSSO symbols in the frequency domain. Cross-correlations of A: The WH0 signal template with a 10-OSSO symbol in which WH0 is present, and B: with a 9-OSSO symbol in which the WH0 signal is absent. In A, there is a finite amplitude at the zeroth time position; in B the amplitude is zero. Cross-correlations of C: The WH9 signal template with a 10-OSSO symbol in which WH9 is present, and D: with a 9-OSSO symbol in which the WH9 signal is absent. In C, there is a finite amplitude at the zeroth time position; in D the amplitude is zero.
Figure 8B:
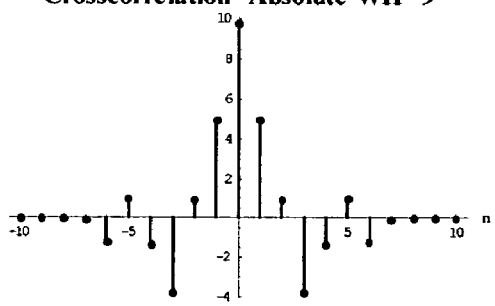
Figure 8B:
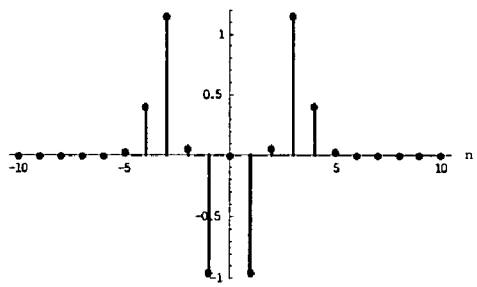
Figure 8B:
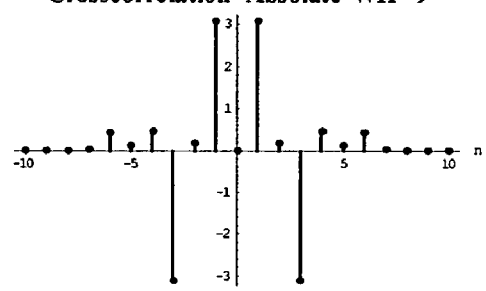

Examples of cross-correlations of signal templates with OSSO symbols in the time and frequency domains are shown in FIGS. 8A and B. These show cross-correlations of the WH0 or a WH9 signal template with a 10-OSSO or 9-OSSO symbol in which the WH0 or WH9 signal is either present or absent. When the relevant signal is present, there is a finite amplitude at the zeroth time position. When the relevant signal is absent, the amplitude at the zero time position is zero. In practice, signal recapture can utilize the inner products of signal templates with OSSO symbols.

Figure 9A:
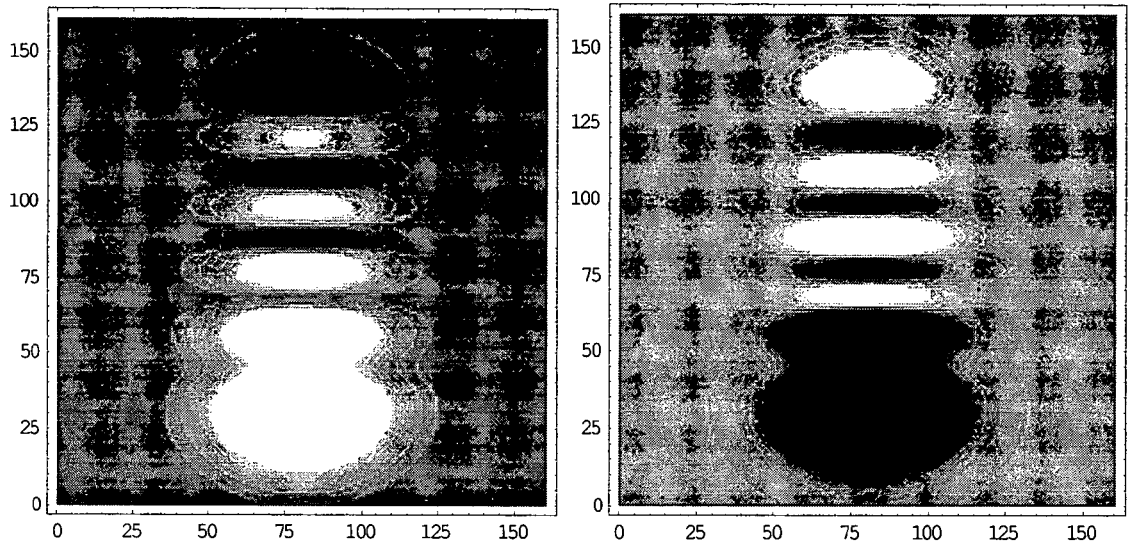
FIG. 9A: Outer products of WH0 and 10-OSSO symbol with WH0 Present (left) and Absent (right) from OSSO symbol.
Figure 9B:
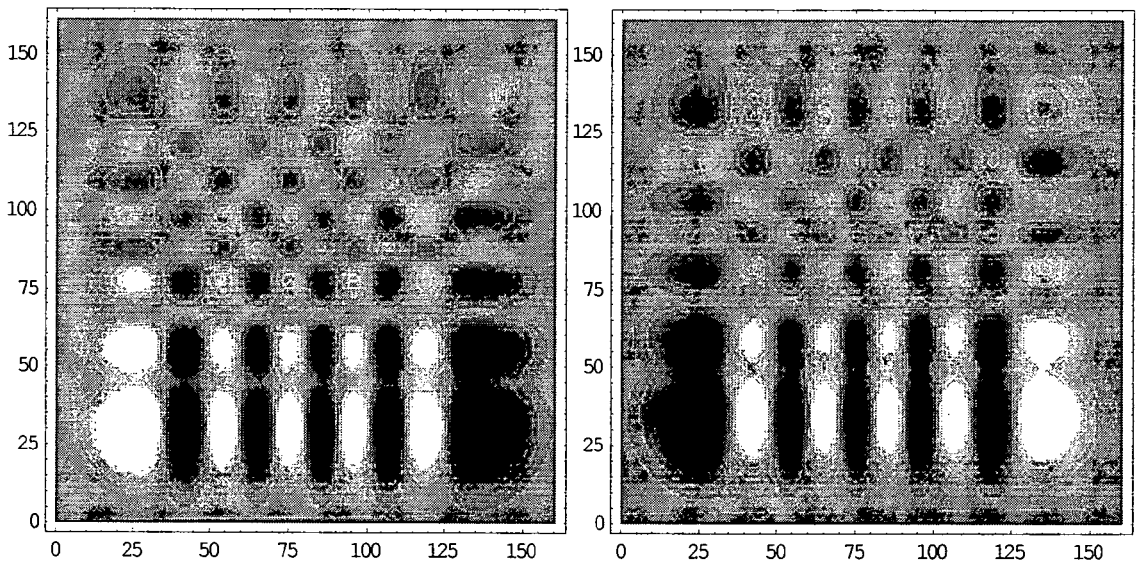
FIG. 9B: Outer products of WH9 and 10-OSSO symbol with WH9 Present (left) and Absent (right) from OSSO symbol.

To illustrate the fundamental nature of the WH signals with respect to the time-bandwidth product overlay within the OSSO symbol, outer products of signal templates with OSSO symbols are shown in FIGS. 9A and B. These show the outer product of the WH0 or WH9 signal template with a 10-OSSO or 9-OSSO symbol in which the WH0 or WH9 signal is either present or absent. When the relevant signal is present, there is a distinctively different surface pattern than when the signal is absent.

Figure 10A:
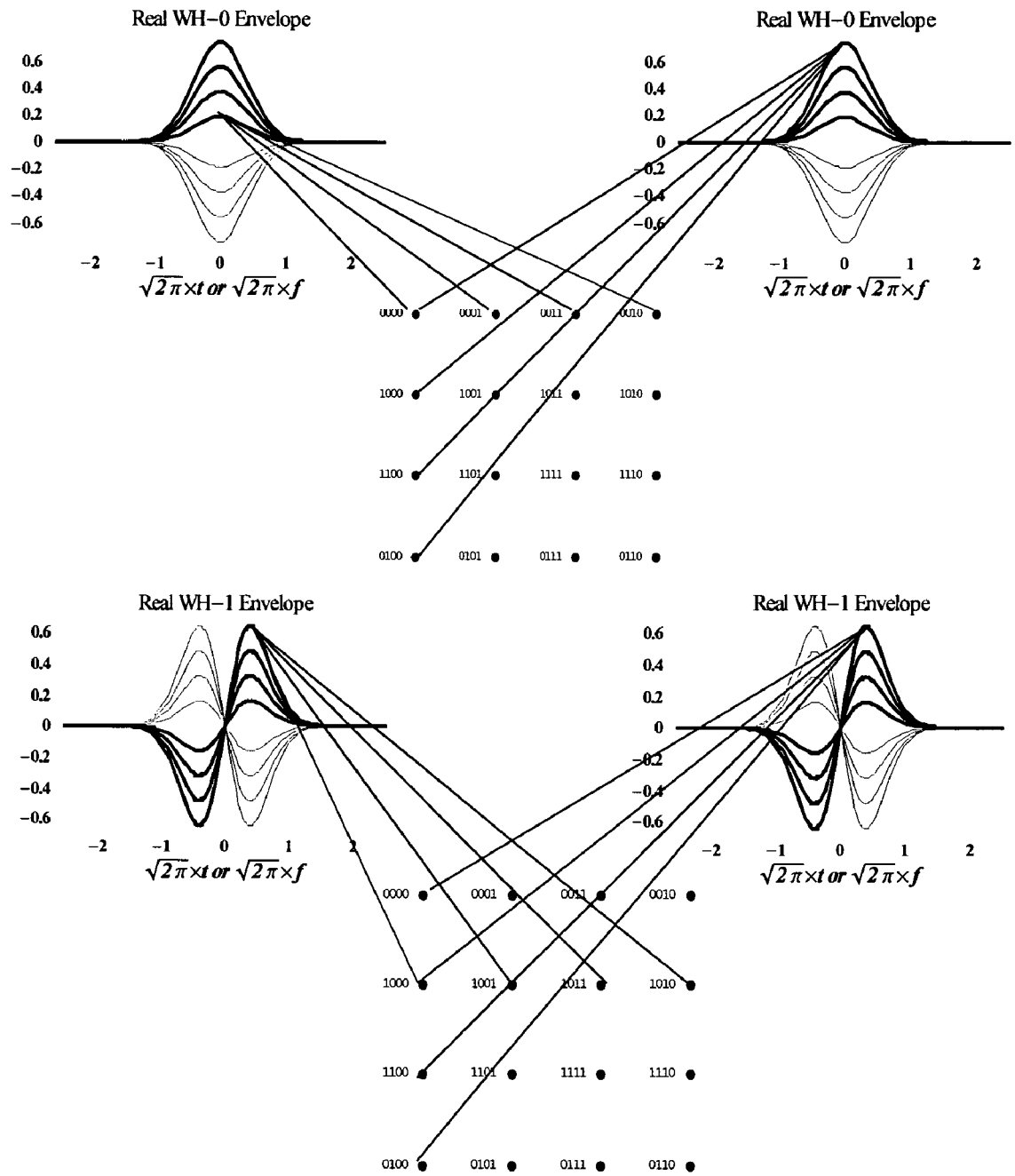
Figure 10B:
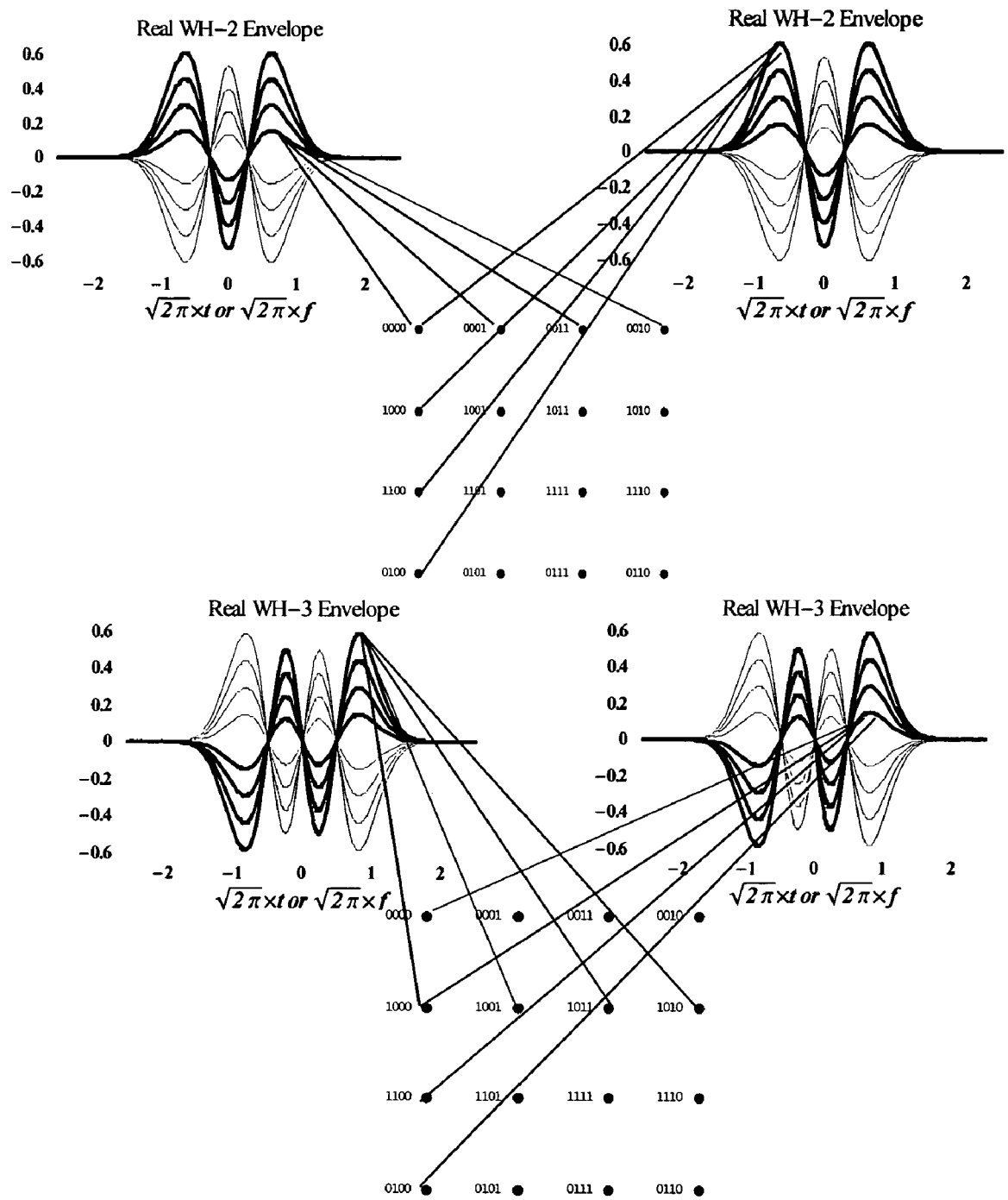

Each WH signal within an OSSO symbol is independently modulated. As illustration, FIGS. 10A and B show how the signals WH0, WH1, WH2 and WH3 are independently 16-QAM modulated.

Figure 11A:
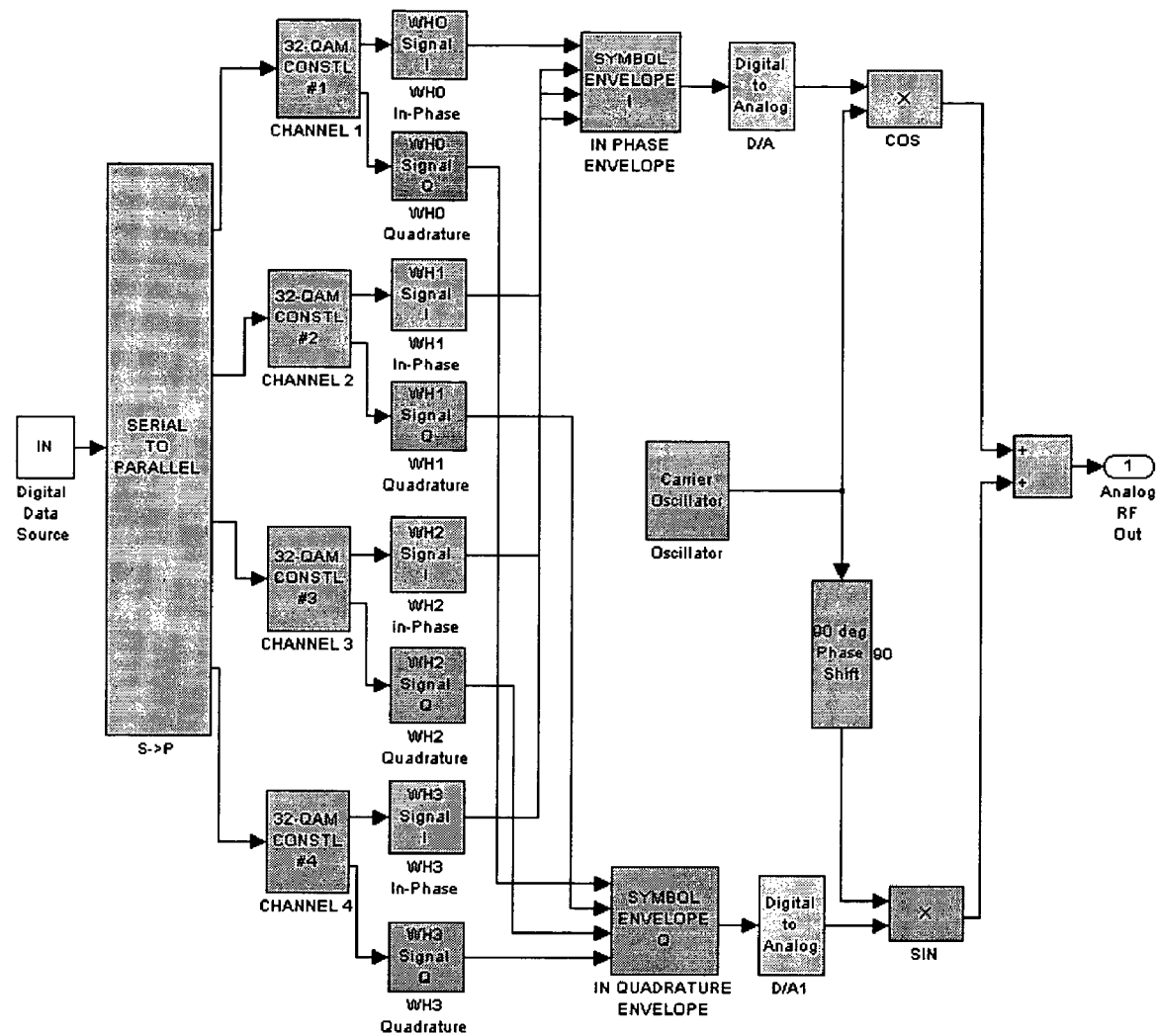
FIG. 11A Representative OSSO transmitter: 4-OSSO-32 in which the OSSO symbol is constituted of four WH signals: WH0, WH1, WH2 and WH3, each of which is modulated in I and Q to form four separate 32-QAM channels. This representation is for illustration purposes as many functions can be performed in software and programmable devices such as FPGAs and DSPs.

The general methods for OSSO transmission and reception at a point of utilization are shown in FIGS. 11A and B. (These are schematic designs for purposes of illustration and in practice operations that are made explicit in these designs can be performed by dedicated and programmable electronic devices such as FPGAs and DSPs.) There is an initial serial-to-parallel conversion of the data stream into words that are assigned to specific WH signals (FIG. 11A). The amplitude of each WH signal in I and Q form assigns a word of information to a constellation. Thus each WH signal forms a different information channel that represents and conveys a different word of information. The different WH signals—in the case illustrated in FIG. 11A there are four WH signals—are summed in I and Q to form the OSSO symbol envelope. This envelope then is D-to-A converted and modulates the carrier in I and Q. Thus the carrier is only of consequence to the data encoding in providing an I and Q phase reference.

Figure 11B:
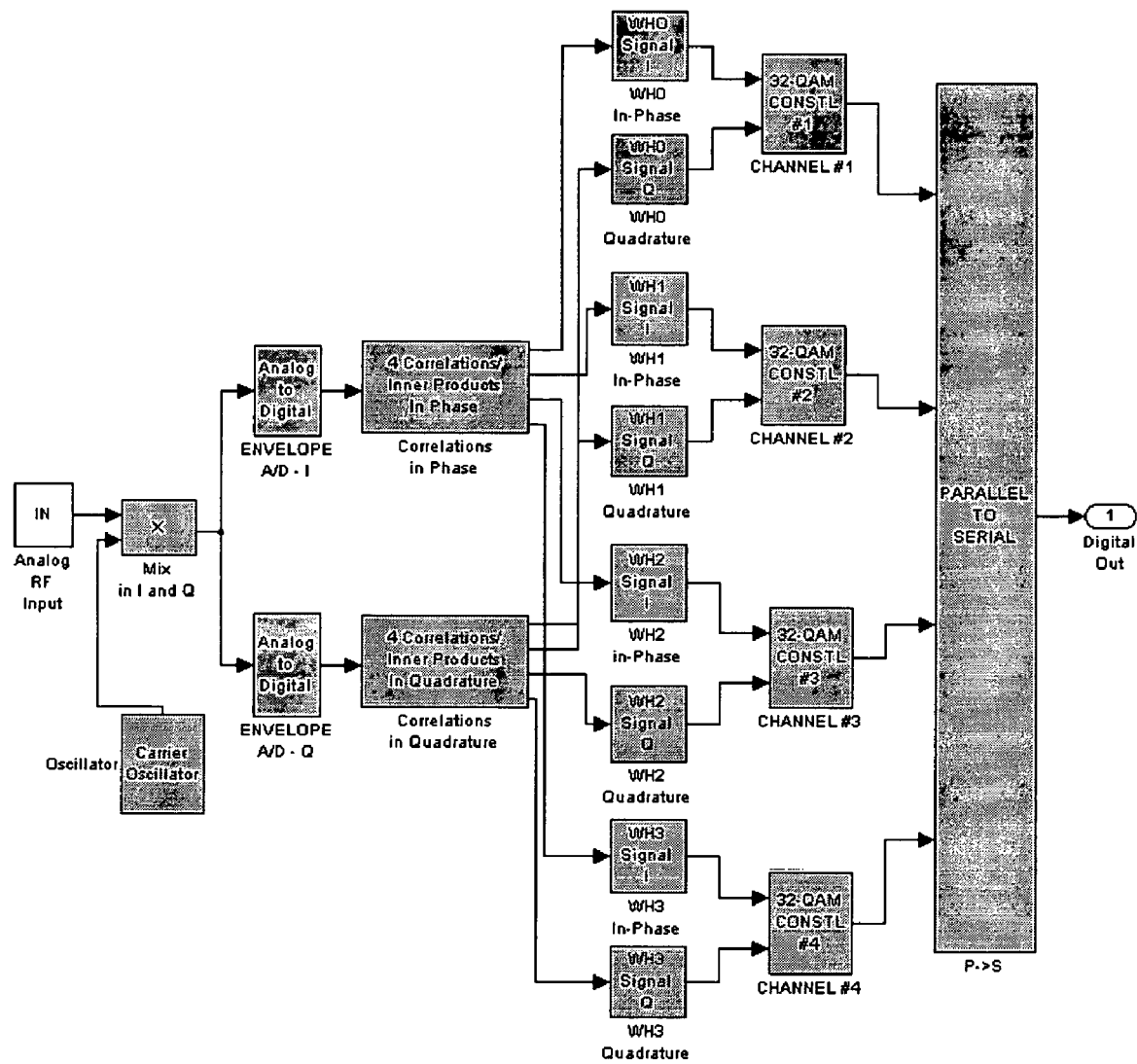
FIG. 11B Representative OSSO receiver (point of utilization): 4-OSSO-32 in which the OSSO symbol is constituted of four WH signals: WH0, WH1, WH2 and WH3, each of which has been modulated in I and Q to form four separate 32-QAM channels. This representation is for illustration purposes as many functions can be performed in software and programmable devices such as FPGAs and DSPs.

The reception follows the transmission procedure in reverse (FIG. 11B) but with the additional step of correlative recapture of the separate WH signals from the OSSO symbol. Before that step, the carrier is removed in I and Q form, thus permitting the recapture of the OSSO envelope in I and Q form. After A-to-D conversion of these envelopes in I and Q, both are correlated in parallel against templates of the WH signals as previously described, of which in this particular example there are four. The output of each correlation operation is a single amplitude value that permits the recapture of the individual channel QAM constellations, defining the individual words of information. Finally, the serial data stream is recaptured by a parallel-to-serial operation on these words.

Figure 12:
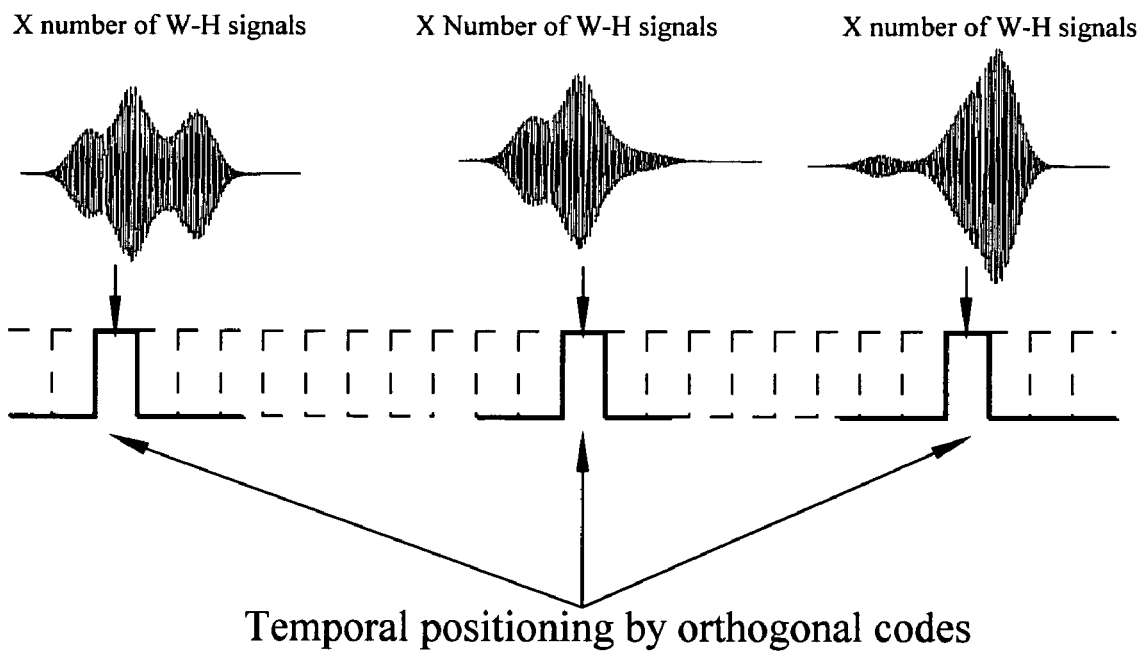
FIG. 12 Representation of positioning of transmitted OSSO symbols using either TDMA or CDMA codes.

These methods described above address the transmission and reception of OSSO symbols. The symbols themselves can be positioned in time in frames according to well-known methods using (time-displacement positioning) orthogonal codes utilized in, e.g., TDMA and CDMA schemes (FIG. 12). As the carrier is relevant only in providing I and Q forms, OSSO can be used as a modulation on any or all separate individual carriers that are sub-bands of a broader bandwidth channel.

PREFERRED EMBODIMENT OF THE INVENTION

The invention can be instantiated in a variety of ways to those familiar in the art of electronics—both in hardware, e.g., FPGAs, DSPs, A-to-D and D-to-A converters, serial-to-parallel and parallel-to-serial converters, LOs of any frequency, or a combination of hardware and software. The invention can be instantiated for wired, fiber, cable, wireless, optical, IR or RF communications systems, and at any signal frequency or for any channel bandwidth. The invention can also be instantiated with signals other than WH signals, e.g., derivatives of raised cosine pulses, or by all signals orthogonal in direct overlay (as opposed to by means of displacement).

Applications

The method and apparatus constructed according to the method have applications in increasing the spectral efficiency of communications channels limited by bandwidth restrictions. The method of the invention applies to any method of communications, whether wired, fiber, cable, wireless, optical, IR or RF communications, and at any signal frequency or for any channel bandwidth. The invention increases spectral efficiency by increasing the effective bandwidth without increasing the physical bandwidth.

In communications channels in general—whether wired, fiber, cable, wireless, optical, IR or RF communications, and at any signal frequency or for any channel bandwidth, the invention features:

- Methods for increasing an effective communications channel bandwidth beyond that of the constrained physical bandwidth of that channel.
- Methods for greatly increasing the spectral efficiency (bits/sec/Hz) of a communications channel by increasing the effective bandwidth.
- Methods that employ orthogonal signal spectrum overlay (OSSO) in a communications channel.
- Methods that employ either Weber-Hermite functions/signals or derivatives of raised cosine pulses or similar or related functions/signals to achieve OSSO.
- Methods that employ overlaid orthogonal signals to achieve OSSO.

While the invention has been described in relation to preferred embodiments of the invention, it will be appreciated that other embodiments, adaptations and modifications of the invention will be apparent to those skilled in the art.

REFERENCES

Barrett, T. W., The information content of an electromagnetic field with relevance to sensory processing of information. *T.I.T. J. Life Sciences*, 1, 129-135, 1971.

Barrett, T. W., On vibrating strings and information theory. *J. Sound & Vibration*, 20, 407-412, 1972.

Barrett, T. W., Conservation of Information. *Acustica*, 27, 44-47, 1972.

Barrett, T. W., Definition precedence of signal parameters: sequential versus simultaneous information. *Acustica*, 27, 90-93, 1972.

Barrett, T. W., The conceptual basis for two information theories—a reply to some criticisms. *J. Sound & Vibration*, 25, 638-642, 1972.

Barrett, T. W., Analytical information theory. *Acustica*, 29, 65-67, 1973.

Barrett, T. W., Structural information theory. *J. Acoust. Soc. Am.*, 54, 1092-1098, 1973.

Barrett, T. W., Structural information theory based on electronic configurations. *T.I.T. J. Life Sciences*, 5, 29-42, 1975.

Barrett, T. W., Nonlinear analysis and structural information theory: a comparison of mathematical and physical derivations. *Acustica*, 33, 149-165, 1975.

Barrett, T. W., On linearizing nonlinear systems. *J. Sound & Vibration*, 39, 265-268, 1975.

Barrett, T. W., Linearity in secular systems: four parameter superposition. *J. Sound & Vibration*, 41, 259-261, 1975.

Barrett, T. W., Information measurement I. On maximum entropy conditions applied to elementary signals. *Acustica*, 35, 80-85, 1976.

Barrett, T. W., Information measurement II. On minimum conditions of energy order applied to elementary signals. *Acustica*, 36, 282-286, 1976.

Barrett, T. W., Structural information theory of sound. *Acustica*, 36, 272-281, 1976.

Barrett, T. W., Quantum statistical foundations for structural information theory and communication theory. pp. 391-409 in V. Lakshmikantham (ed) *Nonlinear Systems & Applications: An International Conference*, Academic Press, New York (1977).

Wu, J., *Wavelet packet division multiplexing*. A thesis submitted to the School of Graduate Studies in Partial Fulfillment of the Requirements of the Degree of Ph.D., Electrical & Computer Engineering, McMaster University, 1998.

What is claimed is:

1. A method for increasing an effective communications channel bandwidth beyond that of a constrained physical bandwidth, and thereby increasing a spectral efficiency and a data rate of a channel, and/or power efficiency of the channel, by orthogonal signal spectrum overlay (OSSO) comprising the steps of:

decomposing a time-bandwidth product (TBP) of a given symbol in a data stream transmitted by a transmitter through a given physical bandwidth; and non-linearly expanding said TBP in terms of an orthogonally overlaid signal basis set constituting eigensignals of said symbol such that the eigensignals resulting from decomposition and non-linear expansion of said TBP of said symbol are overlaid in both time and frequency domains and occupy a same physical space, wherein the number of orthogonal signals obtained in a specific symbol is set by the size of the TBP of the symbol.

2. The method for increasing an effective communications channel bandwidth beyond that of a constrained physical bandwidth, and thereby increasing a spectral efficiency and a data rate of a channel, and/or power efficiency of the channel, by orthogonal signal spectrum overlay (OSSO) comprising the steps of:

decomposing a time-bandwidth product (TBP) of a given symbol in a data stream transmitted by a transmitter through a given physical bandwidth; and non-linearly expanding said TBP in terms of an orthogonally overlaid signal basis set constituting eigensignals of said symbol such that the eigensignals resulting from decomposition and non-linear expansion of said TBP of said symbol are overlaid in both time and frequency domains and occupy a same physical space, wherein the orthogonally overlaid signal basis set are Weber-Hermite (WH) functions and the number of WH signals obtained in a specific symbol is set by the size of the TBP of the symbol.

3. The method defined in claim 1 wherein the complete data stream is multiplexed to produce a plurality of data channels, each of which is encoded on orthogonal signals.

4. The method defined in claim 1 wherein OSSO symbols and associated orthogonal signals are transmitted in quadrature format (I and Q) and is the result of the addition of orthogonal signals, each of which constitutes a separate but overlaid communication channel, all occupying the same physical bandwidth.

5. A system for increasing an effective communications channel bandwidth beyond that of a constrained physical bandwidth, and thereby increasing a spectral efficiency and a data rate of a channel, by orthogonal signal spectrum overlay (OSSO) comprising: means for decomposing the time-bandwidth product (TBP) of a symbol in a data stream transmitted through given bandwidth, and means for non-linearly expanding said TBP in terms of an orthogonally overlaid signal basis set that constitute eigensignals of said symbol within a set channel such that the eigensignals resulting from decomposition and non-linear expansion of said TBP of said symbol are overlaid in both time and frequency domains and occupy a same physical space, wherein the orthogonally overlaid signal basis set are Weber-Hermite (WH) functions and the number of WH signals obtained in a specific symbol is set by the size of the TBP of the symbol.

6. The system for increasing an effective communications channel bandwidth beyond that of a constrained physical bandwidth, and thereby increasing a spectral efficiency and a data rate of a channel, by orthogonal signal spectrum overlay (OSSO) comprising: means for decomposing the time-bandwidth product (TBP) of a symbol in a data stream transmitted through given bandwidth, means for non-linearly expanding said TBP in terms of an orthogonally overlaid signal basis set that constitute eigensignals of said symbol within a set channel such that the eigensignals resulting from decomposition and non-linear expansion of said TBP of said symbol are overlaid in both time and frequency domains and occupy a same physical space, and means to multiplex in the complete data stream to produce a plurality of data channels, each of which is encoded on WH signals.

7. The system defined in claim 6 wherein OSSO symbols and associated WH signals are transmitted in quadrature format (I and Q) and is the result of the addition of WH signals, each of which constitutes a separate overlaid communication channel, all occupying the same physical bandwidth.

8. A transmitter for expanding a time bandwidth product (TBP in terms of an overlaid basis set of signals constituting eigensignals of an orthogonal signal spectrum overlay (OSSO) symbol, comprising means for converting a data word into subwords assigned in parallel to individual orthogonal signals, means for encoding the data for each subword by quadrature amplitude modulation (QAM) of each separate orthogonal signal such that the QAM-modulated signals are then overlaid in quadrature format (I and Q) to form a non-linear symbol modulation and the symbol modulation in I and Q is used as the envelope to a chosen carrier forming the OSSO symbol; digital-to-analog (D-A) means for analog-to-digital conversion of said OSSO symbols and means for transmitting said OSSO symbol on a carrier to a point of utilization.

9. A point of utilization receiver wherein an OSSO symbol is received from a transmitter and the carrier removed, said transmitter including means for converting a data word into subwords assigned in parallel to individual orthogonal signals, means for encoding the data for each subword by quadrature amplitude modulation (QAM) of each separate orthogonal signal such that the QAM-modulated signals are then overlaid in quadrature format (I and Q) to form a non-linear symbol modulation and the symbol modulation in I and Q is used as the envelope to a chosen carrier forming the OSSO symbol; digital-to-analog (D-A) means for analog-to-digital conversion of said OSSO symbols and means for transmitting said OSSO symbol on a carrier to a point of utilization, wherein said receiver comprises: analog-to-digital (A-D) converter means for analog-to-digital conversion of the symbol envelope in I and Q forms, template means for correlating or matching the orthogonal signals against the symbol envelope in both I and Q, permitting the recovery of the QAM constellations associated with each orthogonal signal so that the data for each subword is then recovered from each of the constellations and the symbol data word is recovered by parallel to serial conversion of the signal subwords.

10. The method defined in claim 2 wherein the complete data stream is multiplexed to produce a plurality of data channels, each of which is encoded on orthogonal signals.

* * * * *